US007836303B2

(12) United States Patent
Levy et al.

(10) Patent No.: US 7,836,303 B2
(45) Date of Patent: Nov. 16, 2010

(54) WEB BROWSER OPERATING SYSTEM

(75) Inventors: Henry M. Levy, Seattle, WA (US); Steven Gribble, Seattle, WA (US); Jacob Gorm Hansen, Copenhagen (DK); Richard S. Cox, San Francisco, CA (US)

(73) Assignee: University of Washington, Seattle, WA (US)

( * ) Notice: Subject to any disclaimer, the term of this patent is extended or adjusted under 35 U.S.C. 154(b) by 1244 days.

(21) Appl. No.: 11/298,859

(22) Filed: Dec. 9, 2005

(65) Prior Publication Data
US 2007/0136579 A1 Jun. 14, 2007

(51) Int. Cl.
*H04L 9/00* (2006.01)
(52) U.S. Cl. .................. 713/168; 726/22; 709/203; 709/219; 709/229
(58) Field of Classification Search ............ 713/168; 709/203, 219, 229; 726/22
See application file for complete search history.

(56) References Cited

U.S. PATENT DOCUMENTS

| | | | |
|---|---|---|---|
| 6,865,735 B1 * | 3/2005 | Sirer et al. ........... | 717/158 |
| 2003/0195950 A1 | 10/2003 | Huang et al. ........... | 718/1 |
| 2003/0212902 A1 | 11/2003 | van der Made .......... | 713/200 |
| 2003/0229900 A1 | 12/2003 | Reisman ............... | 718/1 |
| 2004/0255165 A1 | 12/2004 | Szor ................... | 713/201 |
| 2005/0138427 A1 | 6/2005 | Cromer et al. .......... | 713/201 |
| 2005/0182940 A1 | 8/2005 | Sutton et al. .......... | 713/179 |
| 2005/0273856 A1 | 12/2005 | Huddleston ............ | 726/22 |
| 2006/0021029 A1 | 1/2006 | Brickell et al. ......... | 726/22 |
| 2006/0021054 A1 | 1/2006 | Costa et al. ............ | 726/25 |
| 2006/0031673 A1 | 2/2006 | Beck et al. ............. | 713/164 |
| 2006/0112342 A1 | 5/2006 | Bantz et al. ............ | 716/736 |
| 2006/0112416 A1 | 5/2006 | Ohta et al. ............. | 726/1 |
| 2006/0161982 A1 | 7/2006 | Chari et al. ............ | 726/23 |
| 2006/0236127 A1 | 10/2006 | Kurien et al. ........... | 713/193 |
| 2007/0186212 A1 | 8/2007 | Mazzaferri et al. ...... | 725/87 |
| 2007/0256073 A1 | 11/2007 | Troung et al. ........... | 709/219 |
| 2009/0271867 A1 | 10/2009 | Zhang .................. | 726/24 |

OTHER PUBLICATIONS

Davis, "Virtual PC vs. Virtual Server: Comparing Features and Uses", published on May 13, 2005, pp. 1-13.http://www.microsoft.com/windowsserversystem/virtualserver/techinfo/vsysvpc.mspx.*

(Continued)

*Primary Examiner*—Benjamin E Lanier
*Assistant Examiner*—Hadi Armouche
(74) *Attorney, Agent, or Firm*—Ronald M. Anderson

(57) ABSTRACT

A Web browsing system using a browser operating system (BOS), which provides a trusted software layer on which Web browsers execute. The BOS runs the client-side component of each Web application (e.g., on-line banking, and Web mail) in its own virtual machine, which provides strong isolation between Web services and the user's local resources. Web publishers can thus limit the scope of their Web applications by specifying the URLs and other resources that their browsers are allowed to access, which limits the harm that can be caused by a compromised browser. Web applications are treated as first-class objects that users explicitly install and manage, giving them explicit knowledge about and control over downloaded content and code. An initial embodiment implemented using Linux and the Xen virtual machine monitor has been shown to prevent or contain about 87% of the vulnerabilities that have been identified in a conventional web browser environment.

27 Claims, 10 Drawing Sheets

OTHER PUBLICATIONS

Microsoft Corporation, "Microsoft Virtual Server 2005 R2: Microsoft Virtual Server 2005 R2 Technical Overview", First Version: Sep. 2004, Last updated: Dec 6, 2005, pp. 1-17. http://www.microsoft.com/windowsserversystem/virtualserver/overview/vs2005tech.mspx.*

Wang et al. "Automated Web Patrol With Strider Honey Monkeys: Finding Websites That Exploit Browser Vulnerabilities." Microsoft Research, Technical Report, First version: Jun. 4, 2005, Last Updated: Jul. 27, 2005, pp. 1-11.*

* cited by examiner

```
<?xml version="1.0"?>
<Manifest Name="http://www.aa.com/#generated_manifest">
<Application Name="http://www.aa.com/"
             GUID="230884839021434298">
<NetworkPolicy>
  <Service> <Host>aa.com</Host> </Service>
  <Service> <Host>www.aa.com</Host> </Service>
  <Service> <Host>www.touraa.com</Host> </Service>
  <Service> <Host>network.realmedia.com</Host> </Service>
  <Service> <Host>www.macromedia.com</Host> </Service>
  <Service> <Host>www.latinmedios.com</Host> </Service>
  <Service> <Host>ad.doubleclick.net</Host> </Service>
  <Service> <Host>switch.atdmt.com</Host> </Service>

...additional advertising partner sites...

</NetworkPolicy>

<BrowserPolicy>
  <Browser>
    <OS>Windows</OS> <arch>ia32</arch> <app>FireFox</app>
    <url>http://www.mozilla.org/firefox_ia32.vm</url>
  </Browser>

...additional browser instances...

</BrowserPolicy>

<Signature xmlns="http://www.w3.org/2000/09/xmldsig#">

...DSA signature block...

</Signature>
</Manifest>
```

WEB BROWSER OPERATING SYSTEM

GOVERNMENT RIGHTS

This invention was made with U.S. Government support under grant No. CNS-0430477 awarded by the National Science Foundation (NSF). The U.S. Government has certain rights in the invention.

BACKGROUND

The 1993 release of the Mosaic browser sparked the onset of the modern Web revolution. The nascent Web was a hypertext document system for which the browser performed two functions: it fetched simple, static content from Web servers, and it presented that content to the user. A key Web feature was the ability for one Web site to link to (or embed) content published by other sites. As a result, users navigating the early Web perceived it as a vast repository of interconnected, passive documents.

Since that time, the Web has become increasingly complex in both scale and function. It provides access to an enormous number of services and resources, including financial accounts, Web mail, archival file storage, multimedia, and e-commerce services of all types. Users transfer funds, purchase tickets and commodity items, file their taxes, apply for employment, seek medical advice, and carry out a myriad of other interactions through the Web. The perception of the Web has evolved, as well. Today's users see the modern Web as a portal to a collection of independent, dynamic applications interacting with remote servers. Moreover, they expect Web applications to behave like applications executed on their personal computers. For example, users trust that Web applications are sufficiently isolated from one another that tampering or unintended access to sensitive data will not occur, but such expectations are sometimes unrealistic.

To respond to the demands of dynamic services, the browser has evolved from a simple document-rendering engine to an execution environment for complex, distributed applications that execute partially on servers and partially within clients' browsers. Modern Web browsers download and execute programs that mix passive content with active scripts, code, or applets. These programs: effect transactions with remote sites; interact with users through menus, dialog boxes, and pop-up windows; and access and modify local resources, such as files, registry keys, and browser components. The browser, then, has transcended its original role to become a de facto environment for executing client-side components of Web applications.

Unfortunately, current browsers are not adequately designed for their new role. Despite many attempts to retrofit isolation and security, the browser's original roots remain evident. Simply clicking on a hyperlink can cause hostile software to be downloaded and executed on the user's machine. Such "drive-by downloads" are a common cause of spyware infections. Trusted plug-ins may have security holes that permit content-based attacks. Browser extensibility features, such as ActiveX components and JavaScript, expose users to vulnerabilities that can potentially result in the takeover of their machines.

Vulnerabilities can exist in both client-side browsers and in the Web services with which they communicate. In browsers, scripting languages such as JavaScript and VBScript, are a major source of security flaws. While individual flaws can be addressed, the underlying security framework of browser scripting is itself considered unsafe, suggesting that flaws arising from active content will be an ongoing problem.

Java applet security is a well-studied topic. Java's current stack-based security model is significantly stronger than its original model. However, Java applets have recently taken a secondary role on the Web to other forms of active content, such as Flash elements, ActiveX components, and JavaScript. It would be desirable to employ virtual machines to provide a language-independent safe execution environment for browser instances. Even if a browser has security vulnerabilities, it would be desirable to contain those flaws within the virtual machine "sandbox."

Multiple approaches for containing code within sandboxes have been explored by others, including operating system call interposition, fine-grained capability-based systems, intra-process domains, and virtual machine monitors or hypervisors. In addition to exploring such mechanisms, researchers have previously explored appropriate policies and usage models. For example, MAPbox™ defines a set of canonical application class labels (such as compiler, network client, or server) and appropriate sandboxes for them and relies on the user to classify programs according to those labels. Window Box™ provides users with durable, isolated Windows desktops, each associated with different roles or security levels (e.g., work, home, or play). Web services themselves are prone to attack from buffer overruns, SQL injection attacks, and faulty access control policies. Improving Web service security is an active research topic. However, none of the prior art use of virtual machines has been directed to their use in a browser architecture to isolate Web applications from each other.

Users assume that Web applications cannot interfere with one another or with the browser itself. However, today's browsers fail to provide either kind of isolation. For example, attackers can take advantage of cross-site scripting vulnerabilities to fool otherwise benign Web applications into delivering harmful scripted content to users, leaking sensitive data from those services. Other browser flaws let malicious Web sites hijack browser windows or spoof browser fields, such as the displayed URL. Such flaws facilitate "phishing" attacks, in which a hostile application masquerades as another to capture information from the user.

Overall, it is clear that current browsers cannot cope with the demands and threats of today's Web. While holes can be patched on an ad hoc basis, a thorough re-examination of the basic browser architecture is required. To this end, a new browsing system architecture is needed. The new architecture should adhere to three key principles:

1. Web applications should not be trusted. Active content in today's Internet is potentially dangerous. Both users and Web services must protect themselves against a myriad of online threats. Therefore, Web applications should be contained within appropriate sandboxes to mitigate potential damage.

2. Web browsers should not be trusted. Modern browsers are complex and prone to bugs and security flaws that can be easily exploited, making compromised browsers a reality in the modern Internet. Therefore, browsers should be isolated from the rest of the system to mitigate potential damage.

3. Users should be able to identify and manage downloaded Web applications. Web applications should be user visible and controllable, much like desktop applications. Users should be able to list all Web applications and associated servers that provide code or data, and ascribe browsing-related windows to the Web applications that generated them.

It would be desirable to provide a browser operating system architecture that is straightforward to implement, protects against the majority of existing threats, and is compatible with existing Web services and browsers. This architecture should be achieved without compromising user-visible performance, even for video-intensive browsing applications.

SUMMARY

Following these principles, the following discussion is directed to a new browsing architecture that provides strong safety guarantees both to users and Web services. This new approach enables users to gain knowledge and control of the active Web content being downloaded and executed and enables Web services to gain the ability to restrict the set of sites with which their applications can communicate, thereby limiting damage from hijacked browsers. Active Web content and the browser that interprets and renders it are thereby isolated in a private virtual machine, protecting the user's desktop from side-effects, malicious or otherwise.

Accordingly, one aspect of the new browser technology is directed to a method for securely managing Web applications on a computing device that is coupled in communication with a network. The method includes the step of providing a browser operating system to service communications with remote Web sites over the network. For each instance of a Web application that is implemented during communication with a remote Web site, a virtual machine is spawned with the browser operating system and is employed only for that instance of the Web application. Each virtual machine that is spawned has its own separate set of virtual resources. Direct communication is precluded between the virtual machines that have been spawned, between the Web applications, and between each Web application and the main operating system. Also, sharing of the resources between the virtual machines is precluded, so that Web applications are protected from each other and so that the main operating system is protected from the Web applications and from security threats on the network.

The step of spawning preferably comprises the step of executing a single browser instance in the virtual machine to service the Web application that is being implemented. A Web service is employed for specifying characteristics of each Web application in a manifest retrieved by the browser operating system when accessing the Web service for the Web application. The manifest includes one or more of: a digital signature authenticating the Web service, a specification of code that will be run in the virtual machine, and a specification of access policies that will be applied in connection with communications with the network. The specification can include a network policy that specifies remote network services with which a browser instance can interact; and a browser policy, which specifies the code that should be initially installed within the virtual machine in which a browser instance is operating.

The method can also require that a user approve at least an initial installation of a Web application before spawning an instance of the virtual machine in which the Web application will be implemented. The resources provided to each instance of the virtual machine can include a memory, separate processor services, a virtual storage, and a virtual display screen. The virtual machine can receive input from at least one input device, such as a pointing device or a keyboard.

The method can further include the step of enabling creation of one or more sprites by an instance of a virtual machine. Each sprite can include a plurality of tiles that are displayed on the virtual display screen using a data structure maintained in the memory of the virtual machine.

When necessary, a Web application can "fork" a new Web application, by requesting the browser operating system to spawn a new virtual machine implementing the new Web application.

The browser operating system is employed to implement a private temporary storage for each virtual machine. This private temporary storage is used for temporarily holding an object that is to be transferred into or out of the virtual machine. Using a store call, an object can be transferred into the temporary storage from outside the virtual machine. In a corresponding manner, a fetch call can be issued to find an object in the temporary storage, for transfer outside the virtual machine. A user is enabled to explicitly initiate a transfer of an object into or out of the temporary storage.

Although the browser operating system can be executed on a computing device without executing any other operating system, in at least one embodiment, it will be appreciated that the computing device can execute a main operating system for controlling the execution of other types of software applications. However, the browser operating system isolates the main operating system from directly interacting with the Web applications during the communication over the network.

Another aspect of the new browser architecture is directed to a computer readable medium on which machine executable instructions are stored for carrying out the steps of the method. Still another aspect is directed to a system coupled in communication over a network, for securely managing Web applications that are executed with the system. The system includes a network interface for communicating with remote Web sites over a network, a user input device, a memory that stores data and machine instructions, and a processor that is connected to the network interface, the user input device, and the memory. The processor executes the machine instructions to carry out a plurality of functions that are generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 5 is an exemplary manifest, which provides access rights to a main Web site and the sites of advertising partners, and indicates that a conventional browser should be run in the browser instance;

DESCRIPTION

Figures and Disclosed Embodiments are Not Limiting

Exemplary embodiments are illustrated in referenced Figures of the drawings. It is intended that the embodiments and Figures disclosed herein are to be considered illustrative rather than restrictive.

Exemplary Browser Architecture

Each exemplary embodiment of the new browser architecture disclosed herein has at least the following six key features:

site

1. It defines a new trusted system layer, the browser operating system (BOS), on top of which browser implementations (such as Netscape or IE) can run.

2. It provides explicit support for Web applications. A Web application includes a browser instance, which has a client-side browser executing dynamic Web content and code, and a Web service, which is a collection of Web sites with which the browser instance is permitted to communicate.

3. It enforces isolation between Web applications, prohibiting one application from spying on or interfering with other applications or host resources. Each Web application has an associated browser instance that is sandboxed within a virtual machine.

4. It enforces policies defined by the Web service to control the execution of its browser instances (e.g., to restrict the set of Web sites with which a browser instance can interact). A Web service provides the BOS with a manifest—an object that defines its policies and other Web application characteristics.

5. It supports an enhanced window interface for browser instances. The BOS multiplexes windows from multiple instances onto the physical screen and authenticates the Web application for users.

6. It provides resource support to browser instances, including window management, network communication, bookmark management, and the execution or "forking" of new Web applications.

Figure 1:
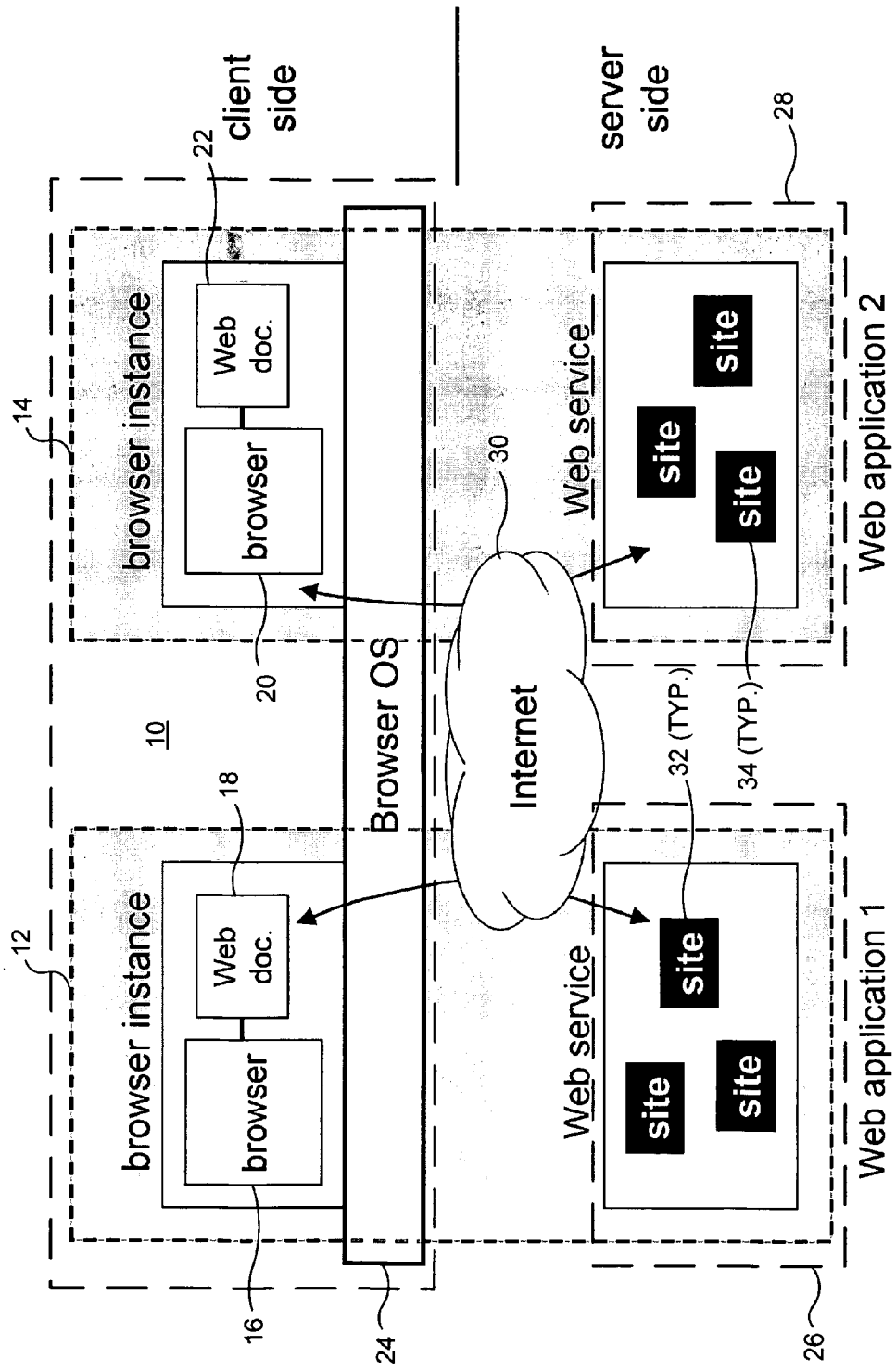
FIG. 1 is a functional block diagram of the new browser architecture, wherein a Web application includes two components (i.e., a client-side browser instance and a remote Web service), and wherein the browser operating system isolates browser instances from each other and also restricts the Web sites with which a browser instance can communicate.

FIG. 1 shows a simplified, high-level view of the new browser architecture. This Figure identifies two Web applications running on a user's computing device 10, the first Web application including a client-side browser instance 12 and a remote Web service 26, and the second including a client-side browser instance 14 and a remote Web service 28. Browser instance 12 comprises a browser 16 and Web documents 18 that it fetches, executes, and displays. Similarly, browser instance 14 includes a browser 20 and Web documents 22 that it fetches, executes, and displays. A BOS 24, shown below the browser instances, isolates the Web applications from each other, preventing resource sharing or communication between browser instances. The BOS also manages communication between each browser instance and Internet 30, permitting access to those sites 32 and 34 (and only those sites) in the corresponding associated Web service.

Key components of this architecture are described in more detail below. Table 1 clarifies the terminology that is used herein and provides the closes analogous term that is used in a conventional operating system environment.

TABLE 1

| Terms Used Herein | Analogous OS Term |
|---|---|
| Web documents: static and active content (e.g., HTML or JavaScript) that a browser fetches from a Web service | documents and scripts |
| browser: client-side software (e.g., Firefox ™, IE ™) that interacts with a user to fetch, display, and execute Web documents | Program |
| virtual machine: a virtual x86 machine that provides the sandboxed execution environment for an instantiated browser | Process |
| browser instance: a browser executing in a virtual machine; a client has one browser instance for each executing Web application | program instance |
| Web Application: the union of a client-side browser instance and a remote Web service that cooperate to provide the user with some application function (e.g., online banking, Web mail) | Distributed application |

Web Applications

Figure 2:
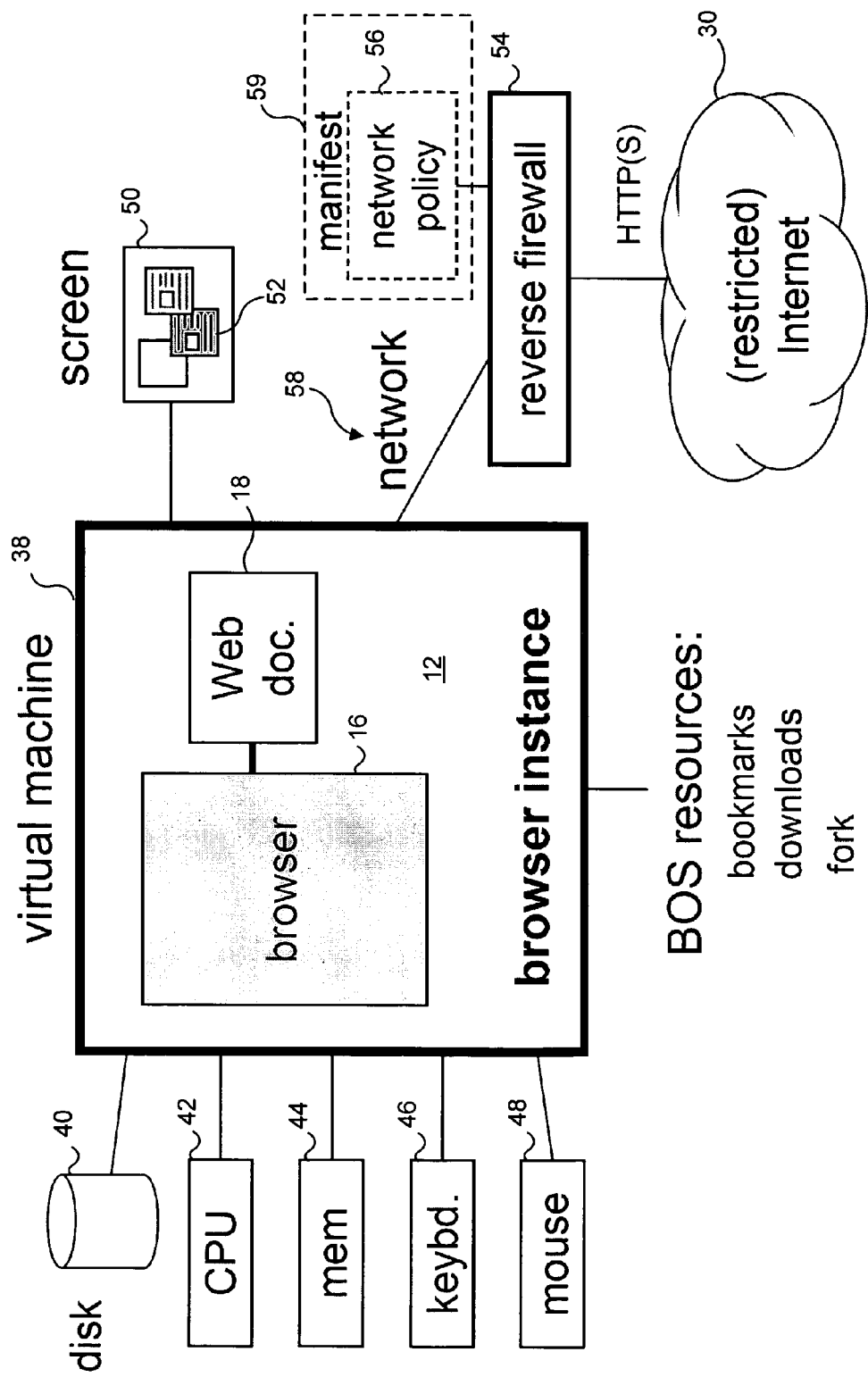
FIG. 2 is a functional block diagram of the execution environment of a browser instance, which executes in a virtual machine sandbox that provides access to private resources and a restricted subset of the Internet.

FIG. 2 shows the execution environment as viewed by client-side browser instance 12. Each browser instance executes in a virtual machine (VM) 38 that has its own private virtual disk 40, CPU 42, memory 44, input devices such as a keyboard 46 and a pointing device (e.g., a mouse) 48, and a screen 50 that displays sprites 52. The VM also supports a virtual network 58, through which the browser instance interacts with remote Web sites over Internet 30 through a reverse firewall 54 that controls transmissions over the Internet in accord with the provisions of a network policy 56 (optional). Unlike conventional browsers, which can browse and display multiple Web sites simultaneously, each browser instance in the present approach is associated with only a single, well-circumscribed Web application, for example, an application that provides online access to the user's bank. Thus, users of this new approach have a unique browser instance associated with each running Web application.

The virtual machine environment provided for the browser instance has several advantages. First, the Web application is safe from interference by other applications. Second, it is free to modify any machine state, transient or persistent, without endangering other applications or the user's host operating system. Third, the user can easily remove all local effects of a Web application by simply deleting its virtual machine. Finally, the VM environment increases flexibility for the programming of Web applications. For example, a service could provide a customized browser rather than using a commodity browser, or it could upload a highly optimized application in x86 machine code.

Web applications are first-class objects and are explicitly defined and managed in this new architecture. The Web service specifies the characteristics of its application in a manifest 59, which the BOS retrieves when it first accesses the service. The manifest includes several key pieces of information. First, it presents a digital signature authenticating the Web service to the client. Second, it specifies the code that will run in the browser instance; it can name a conventional Web browser, or it can specify arbitrary code and data to be downloaded, as described above. Third, it specifies Internet access policies to be enforced by reverse firewall 54. These network policies (like network policy 56 in FIG. 2) define the set of Web sites or URLs that the browser instance is allowed to access.

Network policies protect the Web application from compromised browsers. Browsers are easily compromised by malicious plug-ins or through active Web content that exploits security holes in the browser or its extensions. A compromised browser could capture confidential data flowing between the browser instance and its Web service and send that information to an untrusted Internet site. It could also use the browser instance as a base to attack other Internet hosts. The network policy and reverse firewall aim to prevent both of these attacks by restricting communication from the browser instance to legitimate sites within the Web service.

Users accessing a Web application for the first time must approve its installation on the client. Only then will the browser architecture create a new virtual machine, install within it the browser code and data, and execute the new browser instance. The BOS caches approvals, so the user need not re-approve a Web application on subsequent executions.

Details of the BOS

The browser operating system is the trusted computing base for the present browsing system. It instantiates and manages the collection of browser instances executing on the client. To do this, it must multiplex the virtual screens of each browser instance onto the client's physical display, enforce the network policies of each instance, and durably store state associated with browser instances, bookmarks, and manifests.

Figure 3:
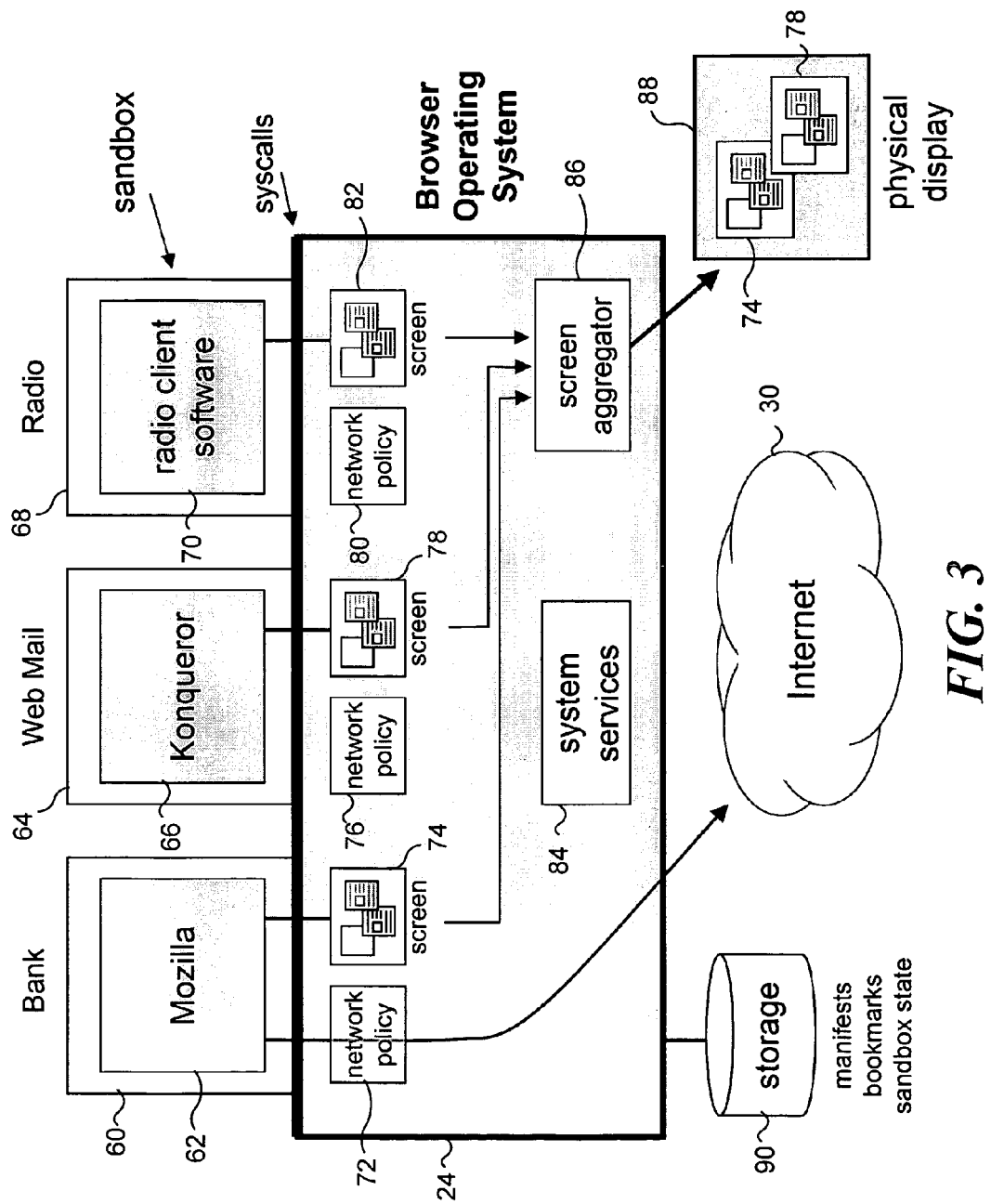
FIG. 3 is a functional block diagram of the browser operating system (BOS), which instantiates and manages sandboxes, stores long-term state associated with browser instances, enforces the network access rights of browser instances, and aggregates their virtual screens into the client's physical display.

FIG. 3 shows a detailed architectural view of BOS 24. The Figure illustrates three Web applications, including an online bank application, a Web mail application, and an online radio application, and their corresponding isolated browser instances 60, 64, and 68, respectively. Two of the browser instances 60 and 64 contain conventional browsers (Mozilla™ 62 and Konqueror™ 66), while the third is executing a custom radio client software application 70, instead of a conventional Web browser.

The BOS provides the highest level user interface, letting users manipulate the virtual screens of each browser instance. In addition, it wraps each virtual screen 74, 78, and 82 with a border that the browser instance cannot occlude. As part of this border, the BOS provides trusted information to the user, such as the name and credentials of the Web application with which the screen is associated. The BOS routes input events to an appropriate browser instance as indicated by the user, similar to the way conventional window systems operate. A screen aggregator 86 in the BOS controls the display of the virtual screens (such as virtual screens 74 and 78) on a physical display 88.

The BOS also provides users with a set of control panels and bookmark management tools, included in system services 84. These components let the user install, execute, and uninstall Web applications, as well as create bookmarks that point to documents within a Web application. A bookmark has a familiar meaning in the context of a conventional Web browser. However, a Web application that provides its own custom browser instance may co-opt bookmarks for its own purposes. For example, a browser instance that provides a streaming radio service could use bookmarks to implement radio channels.

The BOS mediates all network interactions between a browser instance and remote Web sites. To access the Web, a browser instance invokes a BOS system call that fetches Web documents over HTTP. The BOS will service the connection only if the document falls within the network policy (e.g., network policy 72, 76, and 80, specified in the instance's manifest, which is maintained in a storage 90). If not, the BOS refuses the request. If the document is allowed by the manifest of a different Web application, the BOS gives the user the option of loading it into that Web application's browser instance.

Web applications have durable state that the BOS must manage. Sandboxes provide private virtual disks to browser instances, and the BOS maintains the state of these disks between invocations of the Web application. It also stores a set of "stock" browser instances (e.g., Mozilla) that can be cloned when installing a Web application. Finally, the BOS stores manifests and bookmarks associated with Web applications. It treats all long-term storage as a soft-state cache. Accordingly, durable state can be evicted, but at the cost of having to re-download manifests or re-install browser instances when the user next accesses a Web application.

Implementation choices for an exemplary embodiment are described below. However, the BOS is designed to be implementable in different ways. For example, it could run in its own virtual machine, with browser instances running in separate virtual machines with their own guest operating systems. Alternatively, it could be implemented as a virtual machine monitor running directly on the physical hardware, with browser instances running in VMs above it.

Summary of Benefits of the New Browser Architecture

The new browser architecture is driven by the principles described above (i.e., distrust of Web browsers and applications, and the empowerment of users). The resulting architecture isolates Web applications, protecting other applications and client resources from malicious downloaded code. In addition, it permits Web services to build safer, more powerful Web applications. Overall, one goal is to accept the enhanced role of modern browsers in managing the client-side components of complex, non-trusted, distributed applications. The following section presents a prototype implementation.

Implementation

This section describes the central components of an exemplary prototype implementation of the new browser architecture. These components include: the BOS, which includes a BOS kernel, a network proxy, and a window manager; the browser instances; and an underlying Xen virtual machine monitor.

Xen and the BOS

Figure 4:
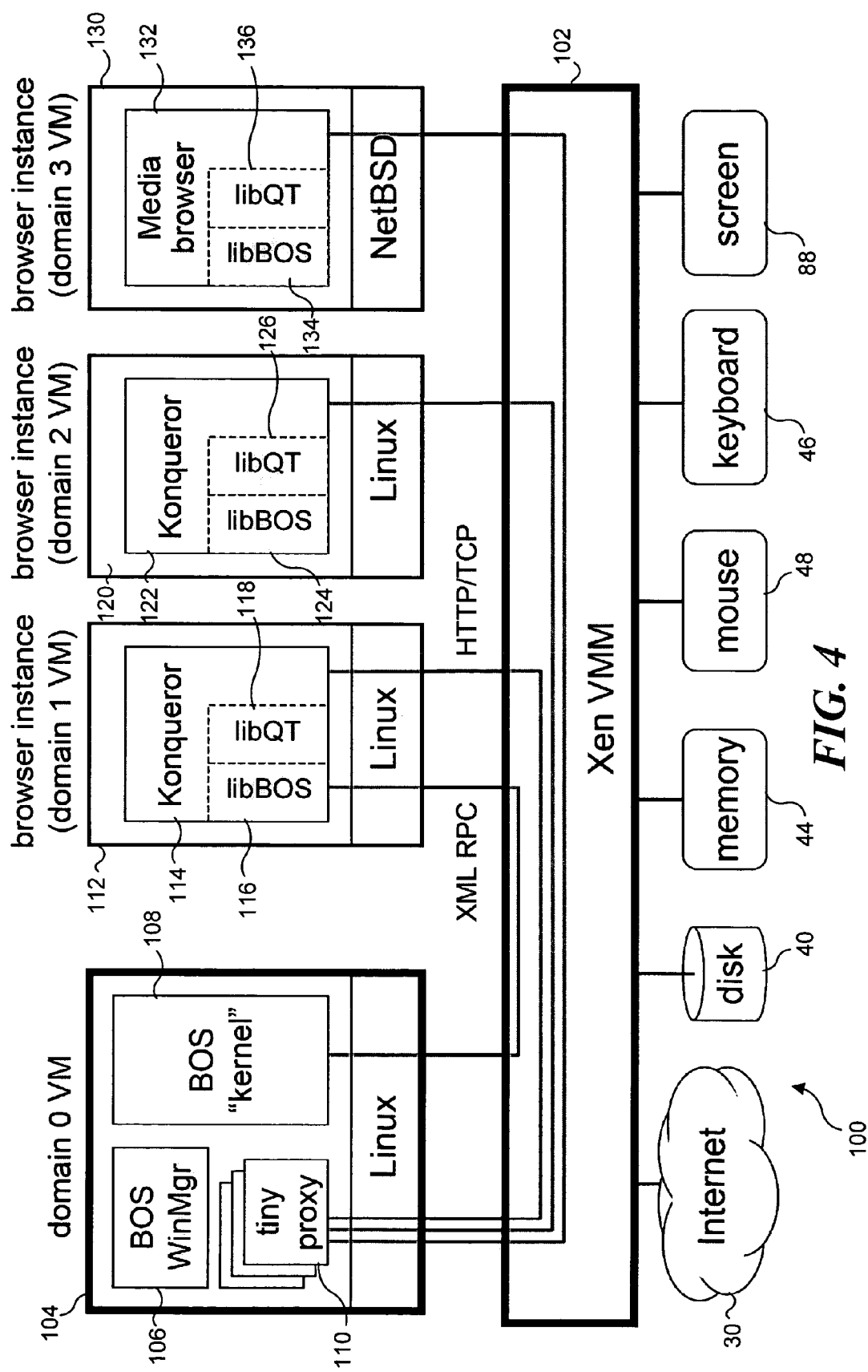
FIG. 4 is a functional block diagram of an exemplary implementation in which a Xen virtual machine monitor isolates browser instances by sandboxing them in virtual machines, and in which processes running within the privileged "domain 0" VM provide BOS services, and additional services are provided by libraries embedded in browsers.

The BOS is a trusted layer in an exemplary embodiment and executes multiple browser instances as required, each within a private, sandboxed execution environment. As shown in FIG. 4, one exemplary implementation 100 uses a Xen virtual machine monitor (VMM) 102. Xen is an open-source VMM that provides para-virtualized x86 virtual machines. It executes in the most privileged mode on bare hardware, including virtual disk 40, memory 44, keyboard 46, mouse 48 and physical screen 88, as shown in the Figure. Above the VMM are individual virtual machines 104, 112, 120, and 130, which Xen names Domain0 through DomainN (virtual machine 130 corresponds to Domain 3, where N is equal to 3). Each domain executes a guest operating system, such as Linux or NetBSD (as shown in the Figure), which runs at a lower privilege level than the VMM. User-mode applications such as Konqueror 114 and 122, or Media browser 132 run on the guest OS at the lowest privilege level.

Xen's Domain0 on VM 104 is special; it performs many of the management functions for Xen, but outside of the VMM. Domain0 has access to all physical memory. It can create and destroy other domains, make policy decisions for scheduling and memory allocation, and provide access to network devices. In this way, many VMM supervisor functions can be programmed as user-mode code on top of the Domain0 guest operating system.

The BOS was implemented in this exemplary embodiment as a collection of processes that execute on Linux in privileged Xen Domain0 VM 104, as shown in the upper left of FIG. 4. The three main BOS processes are: a BOS kernel 108, which manages browser instances and the durable storage of the system; a network proxy 110 (i.e., "tinyproxy"); the reverse firewall that enforces network access policies for Web applications; and a BOS window manager 106, which aggregates browser instance windows into the physical screen.

Each browser instance executes in its own Xen virtual machine. In FIG. 4, the first two browser instances on VMs 112 and 120 are running versions of the Konqueror™ Web browser, which was ported to the new browser architecture, on top of a Linux guest OS. The third browser instance on VM 130 is executing a custom multimedia browser on a NetBSD™ guest OS. The browser instances interface to the BOS through libraries linked into the browser that provide access to BOS system functions 116, 124, and 134 (libBOS) and graphics functions 118, 126, and 136 (libQT). LibBOS, libQT, and the browsers that were implemented are described below.

Browser instances must be able to communicate with the Domain0 BOS processes, and vice versa. The term browser-calls is used to refer to instance-to-BOS communications. In the other direction, BOS-to-instance notifications are delivered as upcalls to the instances.

Browser-calls are implemented as XML-formatted remote procedure calls, carried over a transmission control protocol (TCP) connection. A point-to-point virtual network link carries the remote procedure calls (RPCs) between each instance and a Domain0 BOS process. Because Xen restricts access to point-to-point links to the two VMs involved, the BOS can safely assume messages arriving on these links are authentic, which resembles the way a traditional kernel uses the current process identification (ID) to determine the origin of a system call. The library libBOS contains RPC stubs that expose browser calls to applications as high-level function calls.

Most communication in this implementation occurs within a Web application, between a browser instance and its Web service. However, the BOS provides three inter-application communication paths—fork, BinStore, and BinFetch—that are implemented through browser-calls.

Applications may fork other applications. The fork browser-call includes the target URL to be forked as an argument. Based on this URL, the BOS kernel examines (or downloads) the appropriate manifest and determines which browser instance should handle the request. It then launches the browser instance, if needed, and delivers the URL to the instance through an upcall.

The BOS supports strong VM-based isolation between browser instances. However, it must also permit the controlled transfer of objects outside of a VM. For example, a user should be able to copy a photo from a Web-mail application into a photo album, or vice versa. For the purpose of enabling such controlled transfers, the BOS kernel implements a private "holding bin" or temporary storage for each browser instance. To manipulate the holding bin, the kernel provides two browser-calls—BinStore and BinFetch. A browser instance copies an object to its holding bin by invoking the BinStore browser-call, specifying the object's URL, an object name, and a MIME type. Similarly, the BinFetch browser-call lets the browser instance find and retrieve an object from the holding bin. However, a transfer between the holding bin and the host OS must be initiated explicitly by a user through a trusted tool; it cannot be initiated by the browser instance. In this way, controlled transfers are permitted, but code in the browser instance is prohibited from directly manipulating host OS resources.

Xen and the Browser Instance

Browser instances execute in standard Xen virtual machines, with Xen handling the low-level details of CPU and memory isolation. The BOS augments Xen by enforcing the manifest-specified network policy associated with each browser instance. Browser instances are therefore not provided with an unfettered Internet link. Istead, a Xen (virtual) point-to-point network link is established between the browser instance and the Domain0 VM. In Domain0, a hypertext transfer protocol (HTTP) proxy process is run, which was derived from tinyproxy. The proxy checks each requested uniform resource locator (URL) against the browser instance's network policy, returning an error code if the URL is outside of the manifest-defined Web service.

For unencrypted connections, the proxy can easily filter based on the full URL. Secure sockets layer (SSL) connections, however, encrypt the URL. For these connections, the proxy can filter based only on host and port number. Similarly, other protocols, such as streaming video, can be restricted based only on network- and transport-level connection attributes, since the proxy does not understand their protocols. This approach limits the trustworthiness of the current proxy to that of the domain name service (DNS) system on which it relies, even for SSL-protected connections.

Each Xen VM executing a browser instance includes several virtual disks, which are initialized and controlled by the BOS kernel. A read-only root disk contains the base file system for the browser instance, including the image of its guest operating system. A writable data disk provides storage for any data the browser instance needs to durably store on the local system. When a Web application is launched for the first time, its separate data disk is initialized to a blank file system.

Separating the writable data disk from the read-only root disk permits simple upgrade semantics if the root disk changes; the BOS replaces the root disk, but preserves the data disk. Any data that the browser instance stores in the data disk therefore survive upgrades. More importantly, by making the root disk read-only, root disks can be safely shared across browser instances.

Persistent changes made by the Web application are applied to the virtual data disk on the guest OS, not to the file-system of the main host OS on which the user's computing system is running. In this way, the user's OS is isolated from potentially dangerous changes, such as those made by spyware or other security threats. Equally important, the user can remove all durable changes made by a Web application simply by deleting its browser instance.

Manifests

A Web service defines a Web application by creating a manifest and making it accessible to the BOS kernel. The manifest describes policies and attributes that control the execution and behavior of all browser instances associated with the Web application. A manifest is an XML document that includes: (1) a network policy, which specifies the remote network services with which a browser instance can interact; (2) a browser policy, which specifies the code that should be initially installed within a browser instance's sandbox; (3) a digital signature for the Web service; (4) a human-readable Web application name; (5) a machine-readable manifest name; and, (6) a globally unique identifier for the application. FIG. 5 shows an exemplary manifest 140.

Manifest Location and Authentication

Conceptually, every Web object has an associated manifest in this implementation. Web servers can supply an "X-manifest" HTTP header extension when delivering a Web object. This header specifies the unique name for the object's manifest and a URL from which the manifest can be retrieved by the BOS.

There are two ways for the user to launch a Web application for the first time. First, the user can invoke one of the management tools provided in the new architecture and then pass the URL to it. Second, the user can type the URL into a browser instance of a different Web application. In either case, the result is the same. The BOS performs an HTTP HEAD operation on the supplied URL to find and retrieve the Web application's manifest. It will then fork a new browser instance that executes inside a new Xen virtual machine.

In addition to the HTTP header extension, the new browser architecture also supports per-server manifest files. If a manifest is not provided in an object's HTTP header, the BOS attempts to download "/manifest.xml" from the server providing that object. As a final fall-back, the BOS also consults a local database of manually supplied manifests. If none of these mechanisms succeeds, the BOS automatically generates a new generic manifest that implements the basic Web security model that conventional browsers enforce. The generic manifest permits access to any URLs reached on a path from the top-level URL. However, the BOS forks a new browser instance to execute any document not in the top-level URL's domain.

An exemplary embodiment of the new browser architecture uses public-key certificates to authenticate Web applications to clients. Each Web application has an associated master public/private key pair. Using the private key, Web services sign manifests to prove their authenticity to clients. These signatures are included in the manifests using the XML-SIG standard (in this instance, XML refers to "extended markup language" and SIG refers to a "special interest group" for XML). Note that this certification scheme does not completely solve all trust issues. Neither the BOS nor a user has any reason to initially believe that a particular key pair speaks for the real-world entity that should be associated with the Web application. For this function, the new browser architecture relies on traditional public-key infrastructure (PKI) certification authorities.

Manifest signatures allow an application's manifest to evolve over time. A signature securely verifies that two manifests came from the same source. A Web service can replace an existing application manifest by sending a new manifest with the same name. Or, the service can add a manifest for a Web application by sending a new manifest with a different manifest name but the same application name.

Manifest Policies

As noted above, the manifest network policy describes the access rights of a browser instance by listing the Web sites with which it may communicate. An entry in the list contains a host name (or a regular expression against which candidate host names are matched) and an optional set of qualifiers, including a port, protocol, or URL on that host. The Web service specified by a manifest is defined as the union of all items in its network policy.

To enable an application's Web service to be incrementally defined, a single Web application may include multiple manifests. Because network policies are simply lists, network policies can easily be concatenated within manifests without creating unexpected policy effects.

Web services can express any policy they choose. Nothing prevents one Web application from including a Web object in its manifest that also falls in a second application. In other words, Web applications can overlap. This characteristic reflects the nature of the Web: there are no technical restrictions on linking or embedding content without the approval of its publisher. However, a Web application can prevent its browser instances from fetching content from or sending information to other Web applications.

In addition to the network policy, each manifest specifies the code that should be run in the browser instance. If the Web service wishes to run a conventional Web browser, then the Web service provides a list of permissible browsers and operating systems. As a performance optimization, the BOS kernel stores a set of VM checkpoints of freshly booted conventional browsers. If one of the browser checkpoints matches a permissible browser specified in the manifest, the BOS clones the checkpoint into a new VM sandbox. If not, the BOS relies on the Web service to supply a URL of a VM image to download and execute.

Alternatively, the Web service can mandate that a custom browser instance should run in the sandbox. In this case, the Web service must supply a URL and a hash of the custom VM image to be downloaded. Currently, an exemplary implementation of the present development runs only on the x86 architecture. The VM image must therefore contain a bootable x86 guest operating system and applications.

Network policy creation is not discussed in detail herein, since the topic goes beyond the scope of the discussion. However, a Web crawler has been built to aid in manifest construction and been used to prepare written manifests for the top ten most popular Web sites (as identified by Alexa. com). In general, it was found to be fairly simple to construct manifests with the help of this tool.

The Window Manager

An exemplary user interface for the new browser architecture is implemented by a window manager process running in Domain0. The windowing mechanisms were designed with both performance and safety in mind. For performance, the window manager offloads work, using functions available in the graphics processing unit (GPU) of modern video cards. In addition, browser instances tell the window manager which pixels have been updated, enabling the windows manager to transfer only the "dirty" pixels (i.e., the updated pixels) to the video card. For safety, this implementation ensures that browser instances cannot perform denial-of-service attacks by consuming excessive BOS resources: all graphics state is maintained by and charged to the browser instances themselves.

Figure 6:
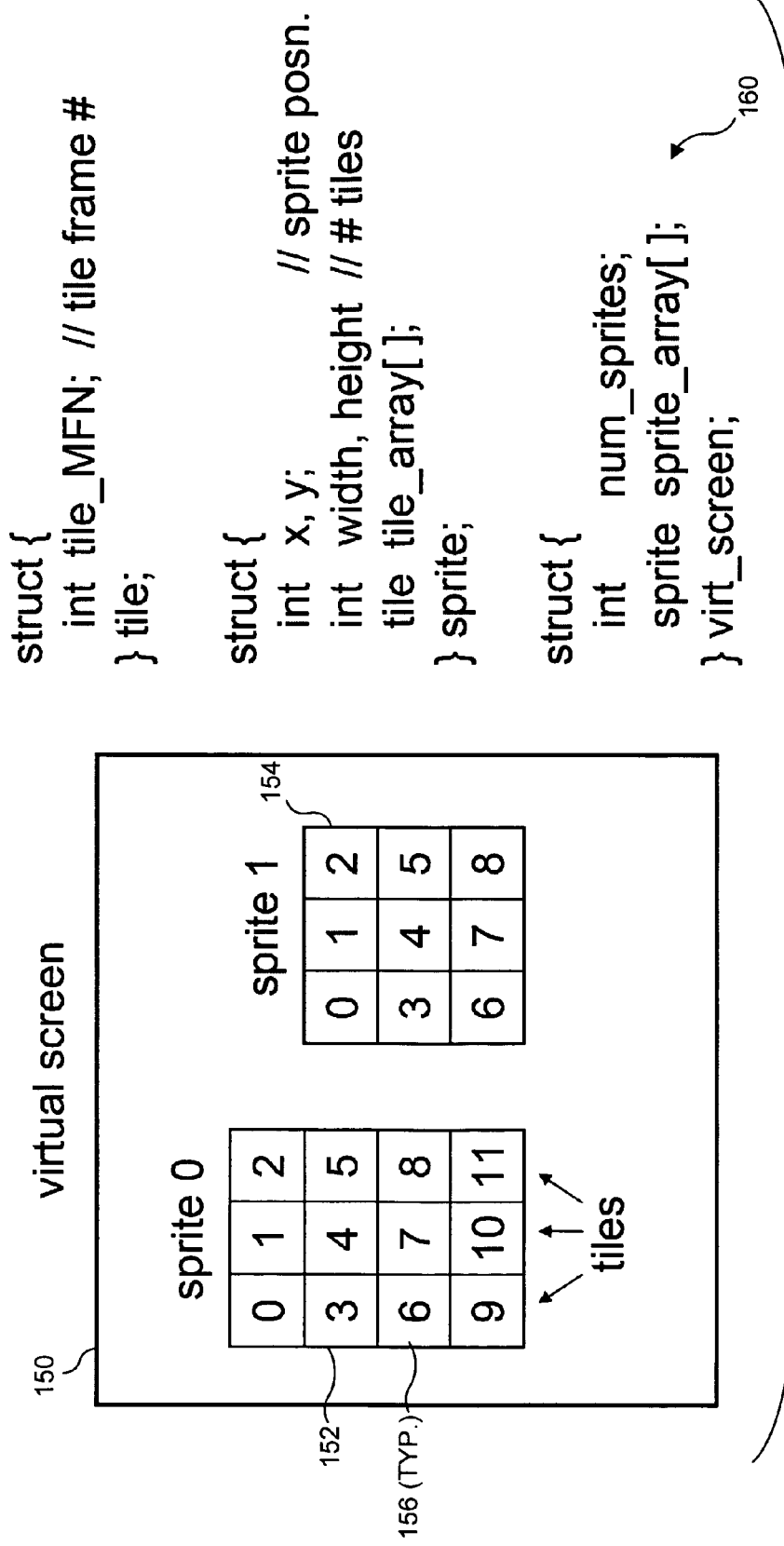
FIG. 6 is a block diagram of an exemplary browser instance that draws sprites into a virtual screen, where each sprite includes a set of 32×32 pixel tiles, each tile fitting on a single 4 KB page, and also showing an exemplary browser instance that maintains a virt screen data structure in memory shared with the BOS window manager.

The window manager in this exemplary implementation provides a virtual screen abstraction 150 to each browser instance, as shown in the example of FIG. 6. Within this virtual screen, the browser instance can create and position one or more rectangular sprites 152 and 154, as shown in FIG. 6. Each sprite includes a grid of tiles 156. A tile, which is backed by a single 4 KB machine page in the browser instance's virtual machine, contains 32×32 pixels, with 32 bits of color and alpha information per pixel.

To expose its sprites and tiles to the window manager, a browser instance maintains a virt screen data structure, such as an exemplary data structure 160, in a standard location in its machine memory. This data structure is simply an array of sprite elements. In turn, a sprite element specifies its position, width, and height in the virtual screen. It also provides an array of tile elements. A tile points to the frame number of the virtual machine page that backs the tile's pixels. Tiles need not be contiguously laid out in machine memory.

Providing browser instances with the abstraction of multiple sprites is useful for several reasons. A Web browser typically exposes multiple windows to the user; each window can be represented by a sprite. In addition, layered user interface elements, such as floating toolbars and pull-down menus, can be incorporated as additional sprites overlaid on the main window sprite.

Using page-aligned tiles, the dirty-page tracking of the CPU memory management unit (MMU) can be exploited. Using a browser-call, a browser instance notifies the window manager that it has updated some of its sprites. By scanning the caller's virt screen data structure, the window manager can inspect the page table entries of tiles to determine whether they have been modified. If so, the window manager copies the modified tiles to the graphics card, thereby updating the screen. Because the window manager does not directly maintain any graphics state and decides when to copy tiles to the video card, browser instances cannot cause the window manager to consume excess memory or perform too many tile copies.

Figure 7:
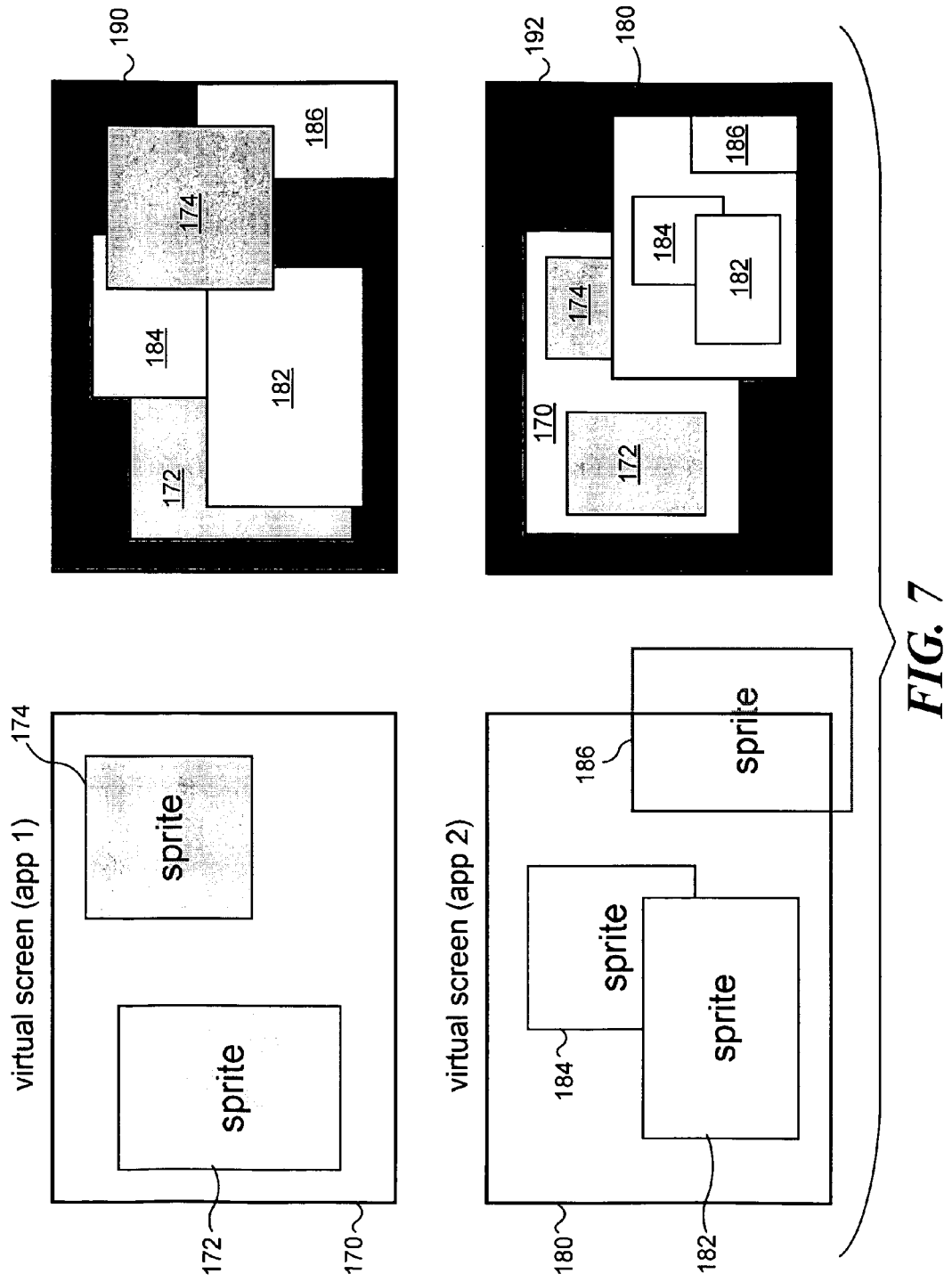
FIG. 7 is a block diagram of an exemplary window manager that aggregates the virtual screens of each browser instance on the physical screen, and illustrates an exemplary policy in which individual sprites from each instance are all collapsed into a single drawing area, as well as an exemplary policy in which the window manager preserves the isolation of sprites in their own virtual screens.

The window manager superimposes sprites, such as exemplary sprites 172 and 174 of a browser instance in a virtual screen 170 for a first Web application, and such as exemplary sprites 182, 184, and 186 in a virtual screen 180 for a second Web application onto the physical computer screen, as shown in FIG. 7. Many different policies are possible. For example, the window manager could co-mingle the sprites of all browser instances in a main screen area 190, as shown on the upper right of FIG. 7. Alternatively, it could preserve the notion of virtual screens in a main screen area 192, as shown in the lower right side of FIG. 7.

To simplify the task of porting existing browsers to the new browser architecture, the Qt multi-platform GUI library was modified to interact with the window manager through its tiles and sprites abstractions. Qt's API was preserved; as a result, Qt compatible applications can be re-linked against the modified libQT to make them work with the graphics subsystem of this embodiment.

Use of Conventional Browsers in the New Browser Architecture

The execution environment of a browser instance is based on a Xen virtual machine. Therefore, most Web applications will run on the new browser architecture with little or no modification. However, three kinds of modifications may be necessary: (1) linking to libQT to access the graphics subsystem used by the new browser architecture; (2) using a browser-call to access remote services, rather than accessing the network directly through a virtual device; and, (3) using browser-calls for new functions, such as forking a new browser instance or interacting with the holding bin.

To date, two conventional browsers have been implemented in this new browser architecture: a port of the Konqueror Web browser and a port of the MPlayer media player. Konqueror is a fully featured Web browser that supports Java applets, JavaScript, SSL, DOM, and cascading style sheets. The MPlayer media player supports most popular video and audio codecs, either natively or by wrapping third party binary codec libraries. The MPlayer implementation is performance focused, optimizing the speed of video decoding via specialized hardware features, such as CPU SIMD extensions or GPU color space conversion and image scaling.

The MPlayer port demonstrates the flexibility of the new browser architecture. By selecting MPlayer to run in their browser instances, Web services can provide users with streaming media applications, such as Internet radio or television, instead of a more conventional HTML browsing service. From the perspective of a user, an MPlayer browser instance will have a radically different look and feel than a conventional Web browser. From the perspective of new browser architecture, MPlayer is simply a browser instance and is treated like any other browser instance.

Code Size

The components of an initial prototype of the new browser architecture are summarized below in Table 2. The table lists the number of lines of code required to implement each component. From these numbers, it is clear that building on the Xen VMM provides high leverage. Overall, this initial exemplary embodiment of the new browser architecture was implemented in approximately 10 K lines of Perl and C code. The largest component of the new browser architecture is the window management system (40% of the code), followed by the browser operating system kernel (30% of the code). The remainder is in libraries, tools, and the network proxy. It is believed that this implementation complexity is modest, particularly compared to the complexity of a Web browser (two or three orders of magnitude larger) and given the security benefits that the present development provides.

TABLE 2

Code Size

| New Browser Architecture Component | Lines of Code |
|---|---|
| BOS kernel: browser instance and storage management | 3,099 |
| window manager: aggregates virtual screens | 2,032 |
| tinyproxy modifications: reverse firewall to enforce network policy | 455 |
| shared library: common code to BOS kernel, libBOS, tinyproxy | 1,434 |
| libBOS: RPC stubs for browser calls | 497 |
| libQT: graphics library and drivers for browser instances | 1,961 |
| manifest creation tools: used by Web services | 368 |
| Total: | 9,846 |

The BOS was implemented as a layer on top of the Xen virtual machine monitor. An exemplary implementation benefits from the ability to create and control Xen virtual machines through the Xen Domain0 VM, which makes it possible to program the major components of the new browser architecture—the BOS kernel, the network proxy, and the window manager—as user-mode Domain0 processes. Browser instances, which are encapsulated in Xen virtual machines, communicate with the BOS kernel through high-level browser-calls carried by virtual network links.

The following section evaluates two aspects of the exemplary initial prototype of the new browser architecture: (1) its safety and effectiveness in containing threats, and (2) its performance. The implementation has not yet been optimized, so that the performance results should be considered as an upper bound on the overhead intrinsic to this approach.

Safety and Effectiveness

A critical measure of the value of the new browser architecture is whether it successfully prevents or contains threats that occur in practice. Isolation should provide significant safety benefits. However, the new browser architecture will not prevent all threats.

As an example, security vulnerabilities can arise due to the new browser architecture's dependence on external systems, such as DNS. Attackers that subvert DNS can subvert the network filtering policies of this approach by changing legitimate bindings to point to Internet protocol (IP) addresses outside of the intended domain. The new browser architecture cannot defend itself from these attacks. Another example is a malicious browser instance, which could use a sharing interface provided by the new browser architecture to attack another browser instance or Web application. While the new approach greatly reduces the number of shared channels, these channels still exist. Consider a browser that contains a buffer-overflow vulnerability in its URL parsing code. A malicious browser instance could use the fork browser-call to pass an attack string to a second browser instance, potentially subverting it. Any channel that permits sharing between mutually distrusting Web applications is susceptible to attack.

To quantitatively evaluate the effectiveness of the new browser architecture, a list of 109 security vulnerabilities discovered in current or previous versions of the widely used Mozilla open source browser were obtained. The vulnerabilities were analyzed and classified into five different categories. The five vulnerability categories, along with the features intended to defend against them, are:

Sandbox weakness: Conventional browsers use language and runtime mechanisms to sandbox scripts, applets, and other active Web content, but these language and type-specific sandboxes are often flawed. In contrast, the new browser architecture uses virtual machines as a language-independent sandbox to envelop the entire browser instance.

Vulnerable sharing interface: Conventional browsers contain many programmatic interfaces (e.g., access to the DOM model) and user interfaces (e.g., file upload dialog boxes) for sharing data across security domains. These interfaces can often be subverted. In the new browser architecture, sharing across Web applications is limited to a small set of browser-calls and holding bin manipulation interfaces.

Improper labeling: Conventional browsers assign Web objects to security domains using a complicated set of heuristics. Incorrectly labeling an object as belonging to a domain can enable attacks such as drive-by downloads. In the new browser architecture, Web services explicitly declare the scope of their Web application through manifests.

Interface spoofing: Conventional browsers are susceptible to spoofing attacks, in which a malicious site attempts to occlude or replicate browser UI elements or the "look and feel" of victim sites. In the new browser architecture, the window manager labels the virtual screens or sprites of browser instances within borders that the instances cannot access or occlude.

Other: Some vulnerabilities could not easily be classified; this category is a "catch-all" for these.

Each of the 109 Mozilla vulnerabilities was examined to determine whether the new browser architecture successfully contains or eliminates the threat within the affected browser instance, or whether the attacker can use the vulnerability to harm external resources or Web applications.

TABLE 3

Vulnerabilities

| Class | Examples | Contained by New Browser Architecture |
|---|---|---|
| weak sandbox | Active content can replace a portion of the JavaScript runtime with its own scripts and gain access to trusted areas of Mozilla | 100% (55 of 55) |
| vulnerable sharing interface | By crafting an HTML upload form, attackers can select the name of a file to transfer, accessing any file on the user's machine. | 86% (25 of 29) |
| improper labeling | By subverting DNS, an attacker can trick a browser into sending cached credentials to an IP address of the attacker's choosing | 33% (4 of 12) |

TABLE 3-continued

Vulnerabilities

| Class | Examples | Contained by New Browser Architecture |
|---|---|---|
| interface spoofing | Web content can override Mozilla's user interface, allowing attackers to spoof interface elements or remote sites | 100% (11 of 11) |
| other | Though instructed by the user not to do so, Mozilla stores a password on disk | 0% (0 of 2) |
| | Total: | 87% (95 of 109) |

Table 3 shows the results of an analysis, broken down by vulnerability categories. To provide an examples, one specific attack that was seen for each category is listed. The table shows that the new browser architecture successfully contains or eliminates 95 of the 109 listed Mozilla vulnerabilities (87%). Many of these vulnerabilities are browser implementation flaws that allow a remote attacker to inject code, extract files from the user's machine, or otherwise subvert the browser's security mechanisms. Although the new browser architecture does not directly fix these vulnerabilities, its isolated virtual machines contain the damage to a single browser instance and its application, preserving the integrity of the user's resources, the host operating system, and other browser instances.

A good example of a contained vulnerability is an attack on the SSL certificate management functions of Mozilla. An attacker could deliver a malicious email certificate to Mozilla that would mask a built-in certificate-authority certificate, permanently blocking SSL connections to valid sites. Under the new browser architecture, this attack would succeed on a susceptible browser instance, but it would be contained to that instance.

Performance

The analysis of Mozilla vulnerabilities demonstrates that the new browser architecture can increase safety and security for Web browsing. However, there is typically a tradeoff between safety and performance. The use of virtual machines for isolation raises an obvious performance question: what is the cost of virtualization to the user and to the Web application?

To answer this question, several benchmarks were run to quantify the performance of common Web-browsing operations and the overhead of the browser virtalization. The measurements were made on an Intel Pentium 4™ processor with a 3.0 GHz clock, 800 MHz front-side bus, 1 GB of RAM, and an ATI Radeon 9600 SE™ graphics card. Network operating tests used an on-board Intel Pro/1000 NIC connected to an Asante FriendlyNet GX5-2400™ Gigabit Ethernet switch. Linux version 2.6.10 was booted either directly on the CPU or in Xen virtual machines, as indicated for each experiment. For the Xen-hosted tests, the kernels included the necessary Xen modifications, built from the Xen 2.0 unstable branch with patches through Mar. 7, 2005.

The Cost of Virtual Machine Creation

Although the optimization of virtual machine performance is well studied, virtualization still has a cost. In particular, the exemplary implementation of the new browser architecture frequently creates (or forks) a virtual machine to execute a new browser instance. Forks occur whenever the user enters the URL of a new Web application. Therefore, it was decided to measure the impact of VM fork overhead on users of this new technology.

TABLE 4

Browser Fork Latency

| | Operation | Average Latency |
|---|---|---|
| New browser architecture fork( ) | specialize a pre-forked browser instance | 1.06 seconds |
| | clone a new VM, boot guest OS, launch browser program | 9.26 seconds |
| Native Konqueror open URL | load URL in running Konqueror | 0.84 seconds |
| | warm-start Konqueror | 1.32 seconds |
| | cold-start Konqueror | 5.74 seconds |

Table 4 shows the cost of forking a new browser instance in a virtual machine compared to the cost of starting a new browser in native Linux. The top half of the table shows two different cases in the present technology. The first line shows the time to "specialize" a pre-forked browser instance. Because forking of commodity browsers is expected to be the common case, the new browser architecture maintains a pool of pre-forked guest operating systems with stock browsers (Konqueror was used on Linux for this test). When the BOS receives a fork browser-call, it checks whether a pre-forked version of the specified browser and guest OS is available. If so, then the BOS need only set up the appropriate network policy in a tiny proxy process and "specialize" the browser instance by mounting its data disk. The time to instantiate and specialize a pre-forked browser instance is about 1.06 seconds.

If a compatible pre-forked instance cannot be found in the pool, then to service the fork, a new VM must be cloned, its guest OS booted, and the browser launched. The cost for this full operation is about 9.26 seconds.

For comparison, the bottom half of Table 4 shows the latency of opening a Konqueror window on native Linux. Three cases were measured: (1) the latency of opening a new window in a running Konqueror process; (2) the "warm-start" latency of launching Konqueror, assuming it has been previously launched; and, (3) the "cold-start" latency of launching Konqueror on a cold file system buffer cache. Interestingly, the best case latency with Konqueror on native Linux, about 0.84 seconds for an already executing browser, is only slightly (and imperceptibly) better than the time to launch a pre-forked VM in the new browser architecture, while a warm-start of Konqueror is slightly worse than the pre-fork operation. The latency for a Konqueror cold start on native Linux is about 5.7 seconds, 60% of the latency of a full VM clone and OS boot on the new browser architecture. Both the cold-start and full-clone latencies are relatively long, and it is expected that both could be reduced through optimization.

Network Performance

From the user's perspective, there are two key network related performance metrics for browsing: the latency of fetching a Web page, and the achieved throughput when fetching a large object. On the new browser architecture, all browser network communications flow through the Xen Domain0 VM, where they are filtered by tinyproxy according to the network policy. Therefore, the latency and bandwidth overhead of the additional indirection and filtering were measured.

Figure 8:
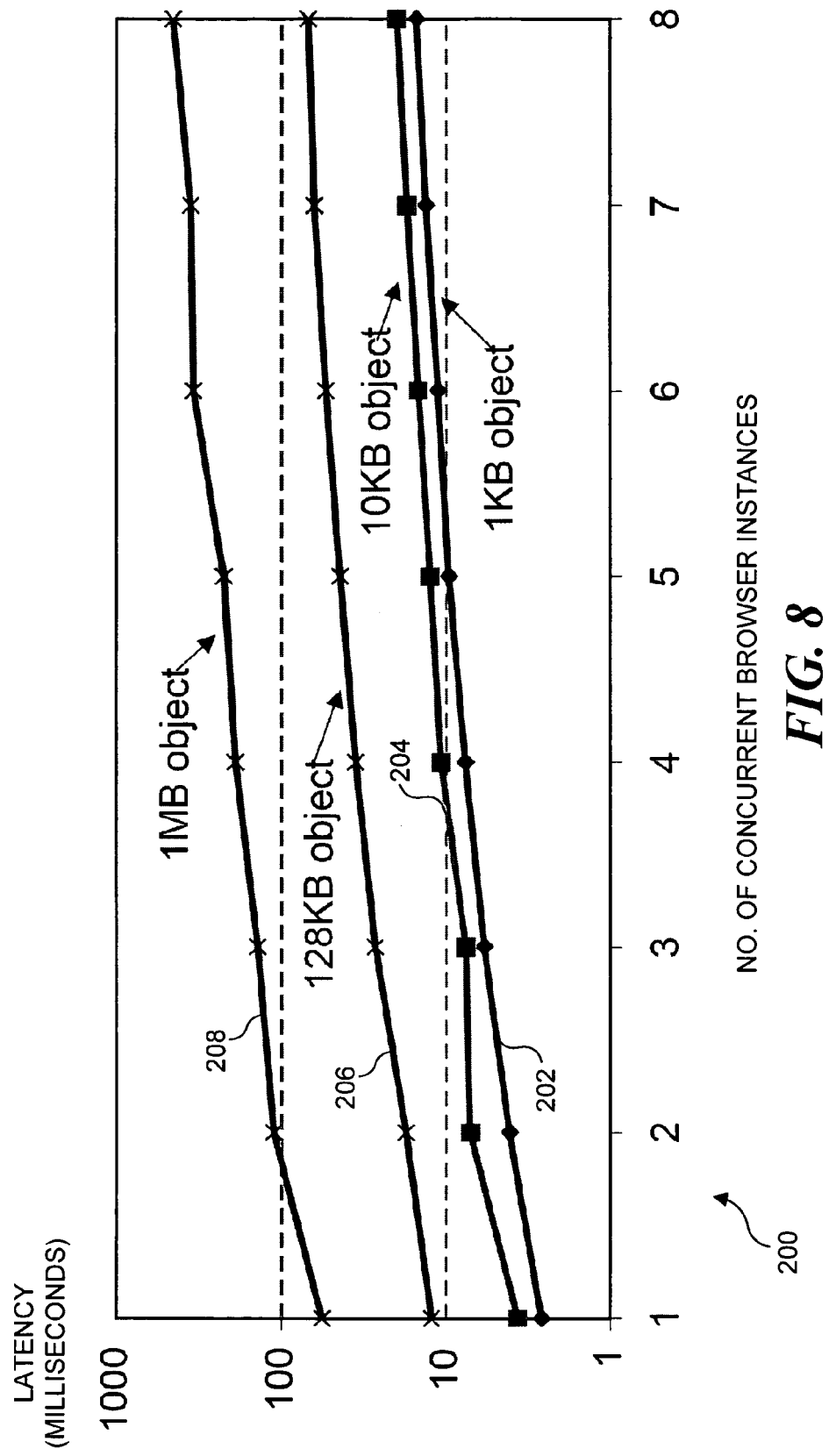
FIG. 8 is a graph for BOS showing the latency of downloading Web objects of different size, with varying numbers of concurrent browser instances actively fetching the object, over a LAN.

To measure the Web-object fetch latency, several concurrent browser instances were started, each scripted to fetch a Web object repeatedly. The average latency to fully retrieve the object from a dedicated server on the local network was measured as a function of the number of concurrent browser instances for different object sizes. FIG. 8 shows results 200. For a single browser instance fetching a 10 KB Web object, the measured fetch latency was about 3.6 ms, as indicated by a line 202. With eight concurrent browser instances, the latency for the 10 KB object grew to 20.1 ms. These results are encouraging, since this latency is well below the 625 ms response-time threshold for users to operate in an optimal "automatic response" mode. As indicated by a line 208, for large Web pages (1 MB), the single-instance latency was 57 ms; at eight concurrent instances, the latency grew to 444 ms. Lines 204 and 206 indicate the results for a 10 KB and 128 KB object, respectively.

As the Web page size grows, the user's perceived response time is dictated by the system's bottleneck bandwidth. The latency measurements were made on a wide-area network. In all cases, network round-trip time and bandwidth dominated the download latency: the new browser architecture was not a bottleneck and had no impact on perceived latency in a wide area network (WAN) setting.

The throughput of a long-lived TCP connection was compared under the new browser architecture and native Linux. For this experiment, a TCP connection was initiated from the client to a server on the local LAN and the sustained throughput from the server was measured. Table 5 shows the results. Surprisingly, the raw throughput of the new browser architecture exceeds that of native Linux: Domain0 achieves about 911 Mb/s bandwidth from the server, compared to about 840 Mb/s on native Linux. High-bandwidth TCP connections are notoriously sensitive to small parameter changes (such as send and receive buffer sizes) or timing discrepancies. Accordingly, it is difficult to fully account for the performance differences, though some may be attributed to Xen optimizations, such as interrupt batching.

TABLE 5

TCP Throughput

| | Scenario | TCP Throughput |
|---|---|---|
| new browser architecture | direct from domain 0 | 911 Mb/s |
| | domain 1, routed through domain 0 | 638 Mb/s |
| | domain, proxied through domain 0 | 637 Mb/s |
| native Linux | direct | 840 Mb/s |
| | through a local proxy | 556 Mb/s |

Table 5 compares the TCP bandwidth achieved in the new browser architecture and native Linux.

From Table 5, it is possible to isolate the costs of indirection and proxying in the new browser architecture. Routing communications through Domain0 from another VM reduces throughput by 30%, to 638 Mb/s. The additional cost of the tinyproxy filtering is almost negligible at that point. From these numbers, it can be concluded that the throughput for the new browser architecture, even when filtered through a proxy in the Domain0 VM, is sufficiently great to support the vast majority of Web browsing workloads.

User Interface Performance

Users are sensitive to the input and output performance of their graphical user interface. The window manager for the new browser architecture is similar to conventional window managers. However, it manages windows across VM boundaries, as opposed to lighter weight process boundaries of a typical OS.

To measure the output performance of the window manager used in this implementation, a variable number of virtual machines were run, each containing an MPlayer browser instance, which is considered a "worst case" test. Each MPlayer application rendered a 512×304 pixel DIVX/AVI video at 25 frames per second. The number of browser instances was increased until MPlayer reported that it could no longer sustain this desired frame rate. This benchmark was run under two configurations of the new browser architecture: (1) each MPlayer running as a browser instance using the window manager of the new browser architecture, and (2) each MPlayer running as a browser instance under the new browser architecture, but using X11 to render to a Domain0 Xserver. An experiment was also run on native Linux, where each MPlayer ran as a Linux process using shared-memory X11 to render to the local Xserver.

Table 6 shows the results. The window manager in this implementation can sustain 12 simultaneous MPlayer instances, achieving an order of magnitude better performance than X11 across virtual machines. Native Linux with shared-memory X11 improves on the new browser architecture by 70% (20 sustained instances), but it does not enjoy the isolation benefits of the new browser architecture. It can be concluded that the ability of this new technology to support 12 simultaneous video players indicates that multiplexing windows from multiple virtual machines should not pose a visible performance problem for users of the new browser architecture.

TABLE 6

Graphics Throughput

| Display System | Unit of Execution | # of Sustained MPlayers |
|---|---|---|
| new browser architecture graphics | VM | 12 |
| (networked) X11 | VM | 1 |
| (shared-memory) X11 | process | 20 |

To measure the input performance of the new browser architecture, the delay between the time a user presses a key and the time the corresponding character is rendered by a Konqueror browser instance was recorded. To do this, Xen was instrumented to timestamp physical keyboard interrupts and Konqueror was instrumented to timestamp character rendering events. In the simple case of a single Konqueror browser instance, the input echo time was under 1 ms. In an attempt to increase window management interference, the same input event can be measured with 10 MPlayer browser instances running 10 video streams concurrently. When competing with the ten MPlayer instances, the Konqueror echo time remained below 12 ms, still imperceptibly small to the user.

Safely Executing Downloaded Applications

The new browser architecture shares the popular vision of making executable content available on the Internet for users to download and run safely. A distributed system has previously been described for authenticating and executing content from remote principals and provides a rich policy structure for assigning access rights to local resources. In contrast, the present new browser architecture uses the shared-nothing abstraction of VMs to isolate downloaded browser instances from each other and from the host OS. Web browsers support the safe execution of Java applets. Applets are similar in principal to the browser instances used in the present new technology, though browser instances can be written in any language, as their execution environment is a hardware virtual machine. The Collective project encapsulates collections of applications within VMware virtual machines and ships these computing "appliances" over the network to users. The new browser architecture is similar, in that browser instances are encapsulated within VMs and downloaded to users. However, unlike in the prior art, the BOS of the present technique mediates the access of browser instances to local host resources and remote Web services.

Exemplary Logical Steps

Figure 9:
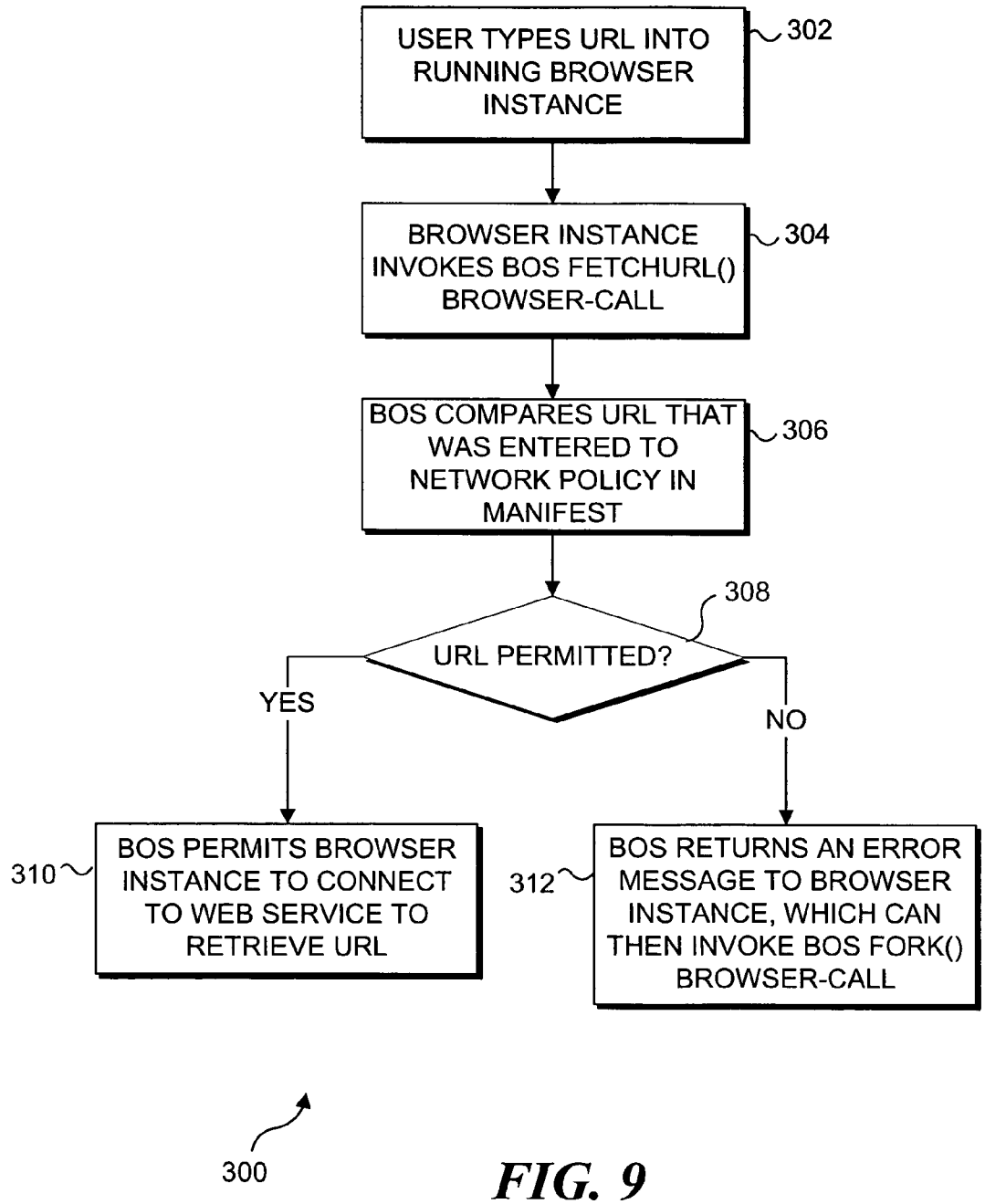
FIG. 9 is a flow chart showing exemplary logical steps for fetching a Web page with a Web service with an existing browser instance running under BOS.
Figure 10:
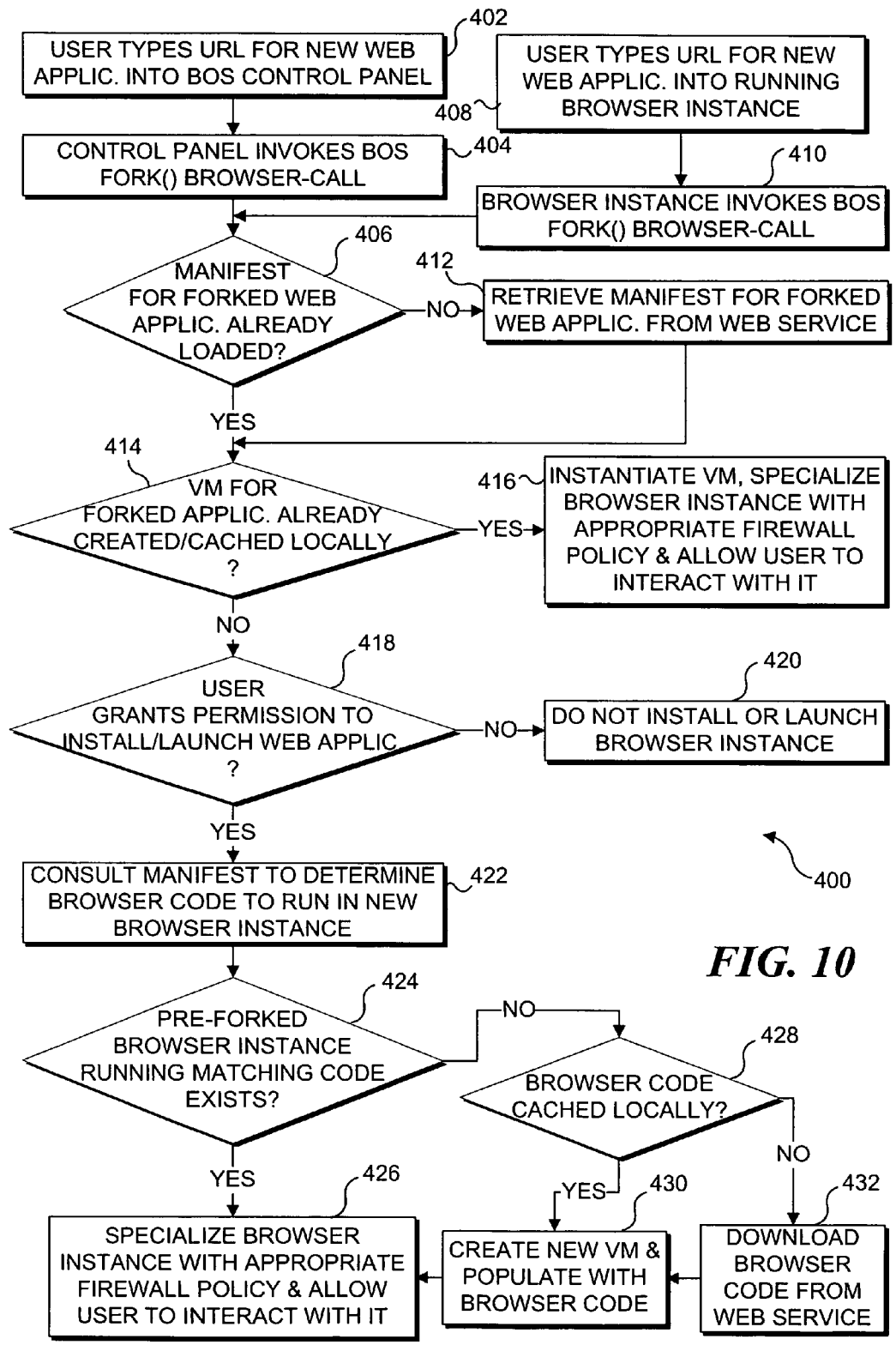
FIG. 10 is a flow chart showing exemplary logical steps for forking a new Web application and browser instance.

FIGS. 9 and 10 respectively illustrate flowcharts 300 and 400 that include exemplary logical steps for fetching a Web page with a Web service with an existing browser instance running under the BOS, and for forking a new Web application and browser instance. Referring first to FIG. 9, in a step 302, a user enters a uniform resource locator (URL) into a browser instance that is running under the BOS. In a step 304, the browser instance invokes a BOS FetchURL( ) browser-call, which is invoked to enable the desired Web page to be fetched over the network via the Web service. A step 306 indicates that the BOS compares the URL that was requested by the user to the network policy in the manifest employed by the BOS. A decision step then determines if the URL is permitted to be retrieved by network policy of the manifest under the existing browser instance, and if so, a step 310 indicates that the BOS permits the browser instance to connect to the Web service to retrieve the URL requested by the user. Conversely, if the URL is not permitted to be retrieved by the network policy of the manifest, the BOS returns an error message to the browser instance, which is displayed to the user. The browser instance can then invoke a BOS fork( ) browser call, to initiate a new browser instance.

FIG. 10 has two entry points—a step 402, which indicates that a user enters a URL for a new Web application into the BOS control panel, and a step 408, which indicates that a user enters a URL for a new Web application into an instance of a browser that is currently running. Following step 402, in a step 404, the control panel invokes a BOS fork( ) browser-call, while if the logic follows step 408, a step 410 provides that the browser instance (which is currently running) invokes the BOS fork browser-call. After either step 404 or step 410, a decision step 406 determines if the manifest for a forked Web application is already loaded, and if so, a decision step 414 determines if a virtual machine for the forked application has already been created or cached locally on the computing device where the URL was entered. A negative response to decision step 406 leads to a step 412, which retrieves the manifest for the forked Web application from the Web service, and the logic then also proceeds with decision step 414. An affirmative response to decision step 414 leads to a step 416, which instantiates the virtual machine, specializes the browser instance with an appropriate firewall policy, and enables the user to interact with the browser instance in running the Web application.

A negative result to decision step 414 leads to a decision step 418, which determines if the user has granted permission to install or launch the Web application. If not, a step 420 terminates the logic by not installing or launching the browser instance to run the Web application. An affirmative response to decision step 418 results in a step 422 in which the manifest is consulted to determine the browser code needed to run the Web application in a new browser instance. A decision step 424 then determines if there exists a pre-forked browser instance that is currently running and which matches the code that was just determined in step 422. If so, a step 426 specializes the browser instance with an appropriate firewall policy, and allows the user to interact with the browser instance to run the Web application. A negative response to decision step 424 leads to a decision step 428, which determines if the browser code is cached locally. If so, a step 430 creates a new virtual machine and populates it with the browser code to create a new browser instance. Otherwise, a step 432 is run before step 430. Step 432 downloads the browser code from the Web service before creating the new virtual machine. After step 430, the logic continues with step 426 to execute the Web application.

CONCLUSIONS

Over the last decade, the Web has evolved from a repository of interconnected, static content to a delivery system for complex, distributed applications and active content. As a result, modern browsers now serve as de facto operating systems that must manage dynamic and potentially malicious applications. Unfortunately, browsers have not adapted to their new role, leaving the user vulnerable to many potential threats.

The new browser architecture implementation discussed above provides a new Web browsing system intended to improve safety and security for Web users. In the new browser architecture, each Web application is isolated within its own virtual machine sandbox, removing the need to trust Web browsers and the services they access. Virtual machine sandboxes contain the damage that can be caused by malicious or vulnerable browsers. Consequently, this approach protects other applications, resources, and the user's host OS from these dangers.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for securely managing Web applications on a computing device that is coupled in communication with a network, comprising the steps of:

(a) providing a browser operating system to service communications with remote Web sites over the network, the browser operating system being employed for controlling operation of the computing device at least in regard to communication over the network, wherein the browser operating system manages each of one or more browser instances executing on the computing device and mediates all network interactions between each browser instance and remote Web sites;

(b) enabling a user to selectively initiate implementation of one or more Web applications while communicating with one or more remote Web sites from within the browser operating system, and as each instance of a Web application is implemented by the user during communication with a remote Web site, spawning a virtual machine with the browser operating system only for that instance of the Web application, wherein each virtual machine that is spawned has its own browser instance and separate set of virtual resources, and wherein the browser operating system routes input events to a browser instance in an appropriate one of the virtual machines; and (c) substantially precluding direct communication between the virtual machines that have been spawned, between the Web applications, and between each Web application and the main operating system, and precluding sharing of the resources between the virtual machines, so that Web applications are protected from each other and so that the main operating system is protected from the Web applications and from security threats on the network.

2. The method of claim 1, wherein the step of spawning comprises the step of executing a single browser instance in the virtual machine to service the Web application that is being implemented.

3. The method of claim 2, further comprising the step of employing a Web service for specifying characteristics of each Web application in a manifest retrieved by the browser operating system when accessing the Web service for the Web application.

4. The method of claim 3, wherein the manifest includes at least one of:
(a) a digital signature authenticating the Web service;
(b) a specification of code that will be run in the virtual machine; and
(c) a specification of access policies that will be applied in connection with communications with the network.

5. The method of claim 4, wherein the specification of access policies includes:
(a) a network policy, which specifies remote network services with which a browser instance can interact; and
(b) a browser policy, which specifies the code that should be initially installed within the virtual machine in which a browser instance is operating.

6. The method of claim 1, further comprising the step of requiring that the user approve at least an initial installation of a Web application before spawning an instance of the virtual machine in which the Web application will be implemented.

7. The method of claim 1, wherein the resources provided to each instance of the virtual machine include a memory, separate processor services, a virtual storage, and a virtual display screen, and wherein the virtual machine receives input from at least one input device.

8. The method of claim 7, further comprising the step of enabling creation of one or more sprites by an instance of a virtual machine, each sprite comprising a plurality of tiles that are displayed on the virtual display screen using a data structure maintained in the memory of the virtual machine.

9. The method of claim 1, further comprising the step of enabling a Web application to fork a new Web application, by requesting the browser operating system to spawn a new virtual machine implementing the new Web application.

10. The method of claim 1, further comprising the steps of:
(a) employing the browser operating system to implement a private temporary storage for each virtual machine, for temporarily holding an object that is to be transferred into or out of the virtual machine;
(b) using a store call to transfer an object from outside the virtual machine into the temporary storage and a fetch call to find an object in the temporary storage for transfer outside the virtual machine; and
(c) enabling a user to explicitly initiate a transfer of an object into or out of the temporary storage.

11. The method of claim 1, wherein the computing device is executing a main operating system, further comprising the step of employing the browser operating system for isolating the main operating system from directly interacting with the Web applications during the communication over the network.

12. A non-transitory machine readable medium having machine instructions that are executable by a computing device for carrying out the steps of claim 1.

13. A system coupled in communication over a network, for securely managing Web applications that are executed with the system, comprising:
(a) a network interface for communicating with remote Web sites over a network;
(b) a user input device;
(c) a memory that stores data and machine instructions; and
(d) a processor that is connected to the network interface, the user input device, and the memory, the processor executing the machine instructions to carry out a plurality of functions, including:
(i) providing a browser operating system to service communications with the remote Web sites over the network, wherein the browser operating system manages each of one or more browser instances executing on the system and mediates all network interactions between each browser instance and the remote Web sites;
(ii) enabling a user to selectively initiate implementation of one or more Web applications while communicating with one or more remote Web sites from within the browser operating system, and as each instance of a Web application is implemented by the user during communication with a remote Web site, spawning a virtual machine with the browser operating system, for use only by that instance of the Web application, wherein each virtual machine that is spawned has its own browser instance and separate set of virtual resources, wherein the browser operating system enables users to manipulate virtual screens of each browser instance; and
(iii) substantially precluding direct communication between the virtual machines that have been spawned, between the Web applications, and between each Web application and the main operating system, and precluding sharing of the resources between the virtual machines, so that Web applications are protected from each other and so that the main operating system is protected from the Web applications and from security threats on the network.

14. The system of claim 13, wherein when the machine instructions cause the processor to spawn an instance of a virtual machine, a single browser instance is executed by the virtual machine to service the Web application that is being implemented.

15. The system of claim 14, wherein the machine instructions further cause the processor to employ a Web service for specifying characteristics of each Web application in a manifest retrieved by the browser operating system when accessing the Web service for the Web application.

16. The system of claim 15, wherein the manifest includes at least one of:
   (a) a digital signature authenticating the Web service;
   (b) a specification of code that will be run in the virtual machine; and
   (c) a specification of access policies that will be applied in connection with communications with the network.

17. The system of claim 16, wherein the specification of access policies includes:
   (a) a network policy, which specifies remote network services with which a browser instance can interact; and
   (b) a browser policy, which specifies the code that should be initially installed within the virtual machine in which a browser instance is operating.

18. The system of claim 13, wherein the machine instructions further cause the processor to require the user to approve at least an initial installation of a Web application, before spawning an instance of the virtual machine in which the Web application will be implemented.

19. The system of claim 13, wherein the resources provided to each instance of the virtual machine include a memory accessible only by the virtual machine, separate processor services, a virtual storage, and a virtual display screen, and wherein the virtual machine receives input from the input device.

20. The system of claim 13, wherein the machine instructions further cause the processor to enable creation of one or more sprites by an instance of a virtual machine, each sprite comprising a plurality of tiles that are displayed on the virtual display screen using a data structure maintained in the memory of the virtual machine.

21. The system of claim 13, wherein the machine instructions further cause the processor to enable a Web application to fork a new Web application, by requesting the browser operating system to spawn a new virtual machine implementing the new Web application.

22. The system of claim 13, wherein the machine instructions further cause the processor to:
   (a) employ the browser operating system to implement a private temporary storage for each virtual machine, for temporarily holding an object that is to be transferred into or out of the virtual machine;
   (b) use a store call to transfer an object from outside the virtual machine into the temporary storage and a fetch call to find an object in the temporary storage for transfer outside the virtual machine; and
   (c) enable a user to explicitly initiate a transfer of an object into or out of the temporary storage.

23. The system of claim 13, wherein the machine instructions further cause the processor to execute a main operating system and to employ the browser operating system for isolating the main operating system executed by the processor, so that the main operating system is prevented from directly interacting with the Web applications during the communication over the network.

24. A method for isolating each of a plurality of Web applications within a "sandbox," to avoid direct interaction between the Web applications executing on a computing device on which the Web applications are being executed and which is coupled in communication with a network, comprising the steps of:
   (a) executing a browser operating system that runs as an interface between the Web applications, and between each Web application and the main operating system, wherein the browser operating system manages each of one or more browser instances executing on the computing device and mediates all network interactions between each browser instance and the remote Web sites;
   (b) enabling a user to selectively initiate implementation of one or more Web applications while communicating with one or more remote Web sites from within the browser operating system;
   (c) using the browser operating system, creating a virtual machine for use by a Web application as the Web application is being initiated by the user, the Web application executing within the virtual machine and being provided with resources that are separate from resources provided to other Web applications, each virtual machine that is spawned having its own browser instance and separate set of virtual resources, wherein the browser operating system routes input events to a browser instance in an appropriate one of the virtual machines; and
   (d) enabling communication over the network by each Web application only through the browser operating system, so that each Web application is generally isolated in a "sandbox" comprising the virtual machine in which it is executed, to protect against security threats made using one of the Web applications and directed toward the other Web applications.

25. The method of claim 24, wherein at least one Web application includes a browser for communicating with a remote site over the network.

26. The method of claim 24, wherein the browser operating system associates a manifest that defines policies for the Web application in connection with communicating over the network.

27. The method of claim 24, wherein the computing device is also executing a main operating system, further comprising the step of preventing any direct interaction between the Web applications and the main operating system.

* * * * *